UNITED STATES PATENT OFFICE.

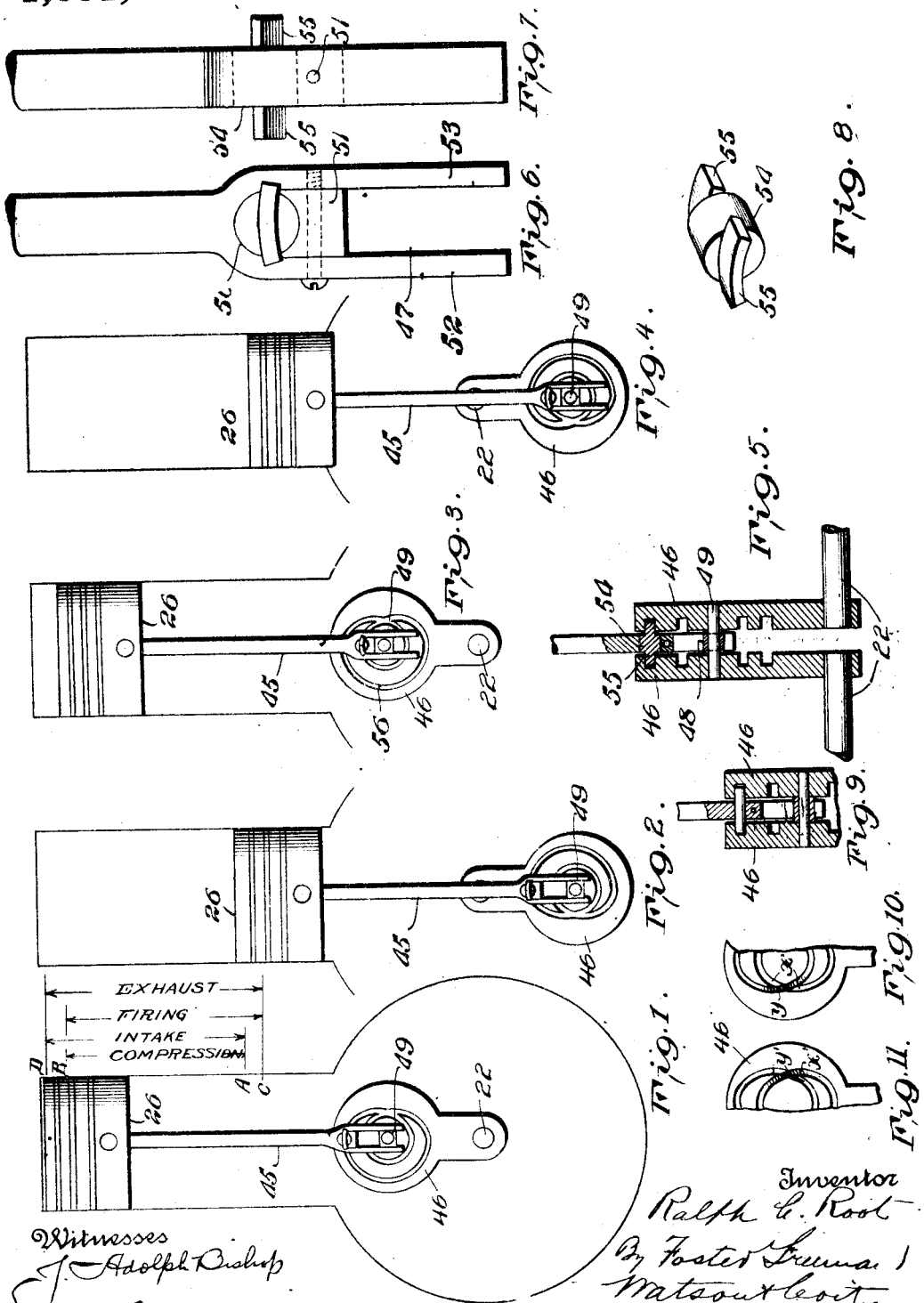

RALPH C. ROOT, OF PENLAN, VIRGINIA.

HYDROCARBON-MOTOR.

1,051,917.  Specification of Letters Patent.  Patented Feb. 4, 1913.

Application filed June 12, 1911. Serial No. 632,800.

*To all whom it may concern:*

Be it known that I, RALPH CHANDLER ROOT, a citizen of the United States, and resident of Penlan, Buckingham county, State of Virginia, have invented certain new and useful Improvements in Hydrocarbon-Motors, of which the following is a specification.

This invention relates to motors and more particularly to motors of the hydrocarbon or internal combustion type and has for one of its objects the provision of novel means for connecting the piston and crank shaft, whereby successive strokes of the piston are varied in length, thereby increasing the efficiency of the engine by allowing longer firing and exhaust strokes and shorter intake and compression strokes.

Other objects and the novel features of the invention will be apparent from the following description taken in connection with the accompanying drawings.

In the drawings: Figure 1 is a central longitudinal sectional view of an engine embodying my invention. Fig. 2 is a view similar to Fig. 1 and showing the piston at the end of the intake stroke. Fig. 3 is a view similar to Fig. 1 and showing the piston at the end of the compression stroke. Fig. 4 is a view similar to Fig. 1 and showing the piston at the end of the firing stroke. Fig. 5 is a detail view showing the connection between the crank disks and the connecting rod. Figs. 6 and 7 are detail views of the crank end of the connecting rod on an enlarged scale. Fig. 8 is a perspective view of the pivot in the connecting rod and carrying the shoes which engage the cam grooves on the crank disks. Fig. 9 is a fragmentary section of the crank disks and connecting rod and showing a modified form of connection. Fig. 10 is a side view of one of the crank disks shown in Fig. 9. Fig. 11 is a side view of the opposite crank disk.

Referring to the drawings it will be seen that I have illustrated a crank shaft 22 having the crank disks 46 thereon, a piston 26 and a connecting rod 45 operatively connecting the piston and the crank disks. The crank end of the connecting rod is forked as shown in Fig. 6, thereby providing a slot 47 in which a block 48 pivotally mounted on a pin 49 connecting the disks 46 is adapted to slide. The inner portion of the slot 47 is made semi-circular in form as at 50 and a block 51 also made semi-circular in form on the side adjacent the portion 50 of the slot 47 is bolted or otherwise secured between the sides 52 and 53 of the connecting rod. The circular opening thus formed between the block 51 and the end of the slot 47 receives the pivot 54, on the outer ends of which are the shoes 55 adapted to slide in the cam grooves 56 formed on the adjacent faces of the crank disks 46. These cam grooves 56 are so formed as to cause the piston to be moved to the extreme end of the cylinder during the exhaust stroke of the engine, thereby expelling practically all of the exhaust gases.

Referring to Figs. 1 to 4 inclusive and more particularly to Fig. 1 whereon the lengths of the various strokes of the piston have been indicated it will be seen that during the intake stroke the piston moves to the point A, that during the compression stroke the piston moves to the point B, during the firing stroke the piston moves outward to the point C somewhat beyond the point A and during the exhaust stroke the piston moves to the point D near the end of the cylinder. It will thus be seen that the intake stroke is comparatively long and is followed by a somewhat shorter compression stroke and a firing stroke of practically the same length as the intake stroke, and the exhaust stroke being the longest. This results in largely increasing the efficiency of the engine by expelling practically all of the exhaust gases and by getting the proper amount of compression in proportion to the volume of the intake charge.

In Figs. 9, 10 and 11 I have shown a modification of the connection between the connecting rod and crank disk. In this form a straight pin 54' is pivoted in the connecting rod and its projecting ends engage the cam grooves in the crank disks and may be provided with anti-friction rollers to engage the cam grooves. The pin is adapted to move back and forth in the direction of its axis and at the points where the cam grooves intersect one groove is deeper than the other. This is illustrated in Fig. 10 in which the groove $y$ is deeper than groove $x$, $x$, the corresponding grooves $y'$ $y'$ and $x'$ in the opposite crank disk being reversely formed as shown in Fig. 11. The advantage of this construction is that the pin is at all times positively guided and there is no liability to take the wrong groove at the point of intersection.

It will be understood that I may omit the shoes 55 on pin 54 and use either a plain pin or a pin with rollers to engage the cam grooves in the construction shown in Figs. 2 to 8.

Having thus described the invention, what is claimed and desired to be secured by Letters Patent is:

1. A four-cycle internal combustion engine comprising a cylinder, a piston, a connecting rod, a crank shaft, a crank disk mounted on the crank shaft, a pin mounted on said disk and having a sliding connection with the connecting rod, a pin carried by the connecting rod and engaging a cam groove in the disk, said cam groove being so arranged as to vary the length of successive strokes of the piston.

2. A four-cycle internal combustion engine comprising a cylinder, a piston, a connecting rod, a crank shaft, crank disks mounted on the crank shaft on opposite sides of the connecting rod, a pin connecting the crank disks and having sliding engagement with the connecting rod, corresponding cam grooves in the adjacent faces of the crank disks, and a pin having pivotal engagement with the connecting rod and provided with means adapted to run in the cam grooves, said cam grooves being so formed as to vary the length of successive strokes of the piston.

3. A four-cycle internal combustion engine comprising a cylinder, a piston, a connecting rod, a crank shaft, crank disks mounted on the crank shaft on opposite sides of the connecting rod, a pin connecting the crank disks and provided with a block pivotally mounted thereon, one end of the connecting rod being forked and having sliding engagement with said block, corresponding cam grooves in the adjacent faces of the cam disks, and a pin having pivotal engagement with the connecting rod and provided with shoes adapted to slide in the cam grooves, said cam grooves being so formed as to vary the length of successive strokes of the piston.

4. An internal combustion engine comprising a cylinder, a piston, a connecting rod, a crank shaft, crank disks mounted on the crank shaft on opposite sides of the connecting rod, a pin connecting the crank disks and having sliding engagement with the connecting rod, corresponding cam grooves in the adjacent faces of the crank disks, a pin having pivotal engagement with the connecting rod and provided with means adapted to run in the cam grooves, said cam grooves being of varying depths whereby said second mentioned pin is reciprocated as the crank disks rotate.

5. In a device of the class described, a connecting rod, a crank shaft, crank disks mounted on said crank shaft on opposite sides of the connecting rod, a pin connecting the crank disks and having sliding engagement with the connecting rod, corresponding cam grooves in the adjacent faces of the crank disks and having intersecting portions, said grooves being of different depths at the points of intersection, and a pin on said rod and engaging said grooves and adapted to be reciprocated thereby as the crank disks rotate.

6. In a device of the class described, a connecting rod, a crank shaft, crank disks mounted on said crank shaft on opposite sides of said connecting rod, a pin connecting the crank disks and having sliding engagement with the connecting rod, corresponding cam grooves in the adjacent faces of the crank disks and having intersecting portions, a pin on said rod and engaging said grooves, said grooves being of differen depths at the points of intersection whereby said pin is reciprocated as the crank disks rotate and is positively guided at said points of intersection.

In testimony whereof I affix my signature in presence of two witnesses.

RALPH C. ROOT.

Witnesses:
E. P. MORGAN,
MAUD G. ROOT.